US011221987B2

(12) United States Patent
Elvheim et al.

(10) Patent No.: US 11,221,987 B2
(45) Date of Patent: Jan. 11, 2022

(54) ELECTRONIC COMMUNICATION AND FILE REFERENCE ASSOCIATION

(71) Applicant: Microsoft Technology Licensing, LLC, Redmond, WA (US)

(72) Inventors: Bjørn Elvheim, Tromsø (NO); Vegar Pettersen, Tromsø (NO); Erlend Jensen, Tromsø (NO); Jon Meling, Tromsø (NO); Terje Johansen, Tromsø (NO); Kristian Elsebø, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 960 days.

(21) Appl. No.: 15/632,029

(22) Filed: Jun. 23, 2017

(65) Prior Publication Data
US 2018/0373714 A1 Dec. 27, 2018

(51) Int. Cl.
G06F 16/16 (2019.01)
G06F 16/176 (2019.01)
G06Q 10/06 (2012.01)
G06F 16/14 (2019.01)

(52) U.S. Cl.
CPC .......... G06F 16/164 (2019.01); G06F 16/156 (2019.01); G06F 16/176 (2019.01); G06Q 10/06 (2013.01)

(58) Field of Classification Search
CPC .... G06F 16/164; G06F 16/156; G06F 16/176; G06F 10/06
USPC ........................................................ 707/804
See application file for complete search history.

(56) References Cited

U.S. PATENT DOCUMENTS

| 6,505,237 | B2 | 1/2003 | Beyda et al. | |
|---|---|---|---|---|
| 7,882,185 | B2 | 2/2011 | Nagarajan et al. | |
| 2004/0243627 | A1 | 12/2004 | Jensen et al. | |
| 2006/0168012 | A1 | 7/2006 | Rose et al. | |
| 2007/0250583 | A1 | 10/2007 | Hardy et al. | |
| 2007/0266102 | A1* | 11/2007 | Heix | G06Q 10/107 709/206 |
| 2008/0256199 | A1* | 10/2008 | Pesala | G06Q 10/107 709/206 |

(Continued)

OTHER PUBLICATIONS

Chitu, Alex., "Search Inside Gmail Attachments", https://googlesystem.blogspot.in/2012/10/search-inside-gmail-attachments.html#gsc.tab=0, Oct. 1, 2012, 2 pages.

Primary Examiner — Kimberly L Wilson

(57) ABSTRACT

Examples of the present disclosure describe systems and methods for electronic communication and file reference association. In an example, a file reference may refer to file content stored by a file service. The file reference may be used to share the file content in an electronic communication among a plurality of users. The file reference may be identified within the electronic communication, and may be used to generate a file node. The file node may store information relating to the file content and/or file reference. A message node associated with the electronic communication may be created, which may be associated with the file node. The file node may later be used to identify electronic communications relating to the file reference. Thus, electronic communications relating to the file reference may be accessible to a user using the file reference or by searching, rather than manually identifying related electronic communications.

18 Claims, 11 Drawing Sheets

(56) References Cited

U.S. PATENT DOCUMENTS

| | | | |
|---|---|---|---|
| 2015/0154253 A1* | 6/2015 | Hampp-Bahnmueller | ............... G06F 16/316 707/713 |
| 2015/0156154 A1* | 6/2015 | Russell | .......... H04L 51/22 709/206 |
| 2015/0169599 A1* | 6/2015 | Burnett | .......... H04L 51/08 707/662 |
| 2015/0310072 A1 | 10/2015 | Dietz et al. | |
| 2016/0019261 A1 | 1/2016 | Fu et al. | |
| 2016/0142350 A1* | 5/2016 | Mutha | ............ H04L 51/18 709/206 |

\* cited by examiner

ELECTRONIC COMMUNICATION AND FILE REFERENCE ASSOCIATION

BACKGROUND

A user may access a user device to share a file with a recipient's user device using an electronic communication. The file may be communicated as a reference, wherein the content of the file may be stored or accessible separate from the electronic communication. As compared to a scenario in which the electronic communication comprises the content of the file (e.g., as an attachment), it may be difficult to provide search, retrieval, and other functionality for a file that was merely communicated as a reference.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for electronic communication and file reference association. In an example, a file service may store a file, wherein the file may be accessible using a file reference (e.g., a URL or GUID, etc.). The file may be shared among a plurality of users using the file reference, wherein the file reference may enable each of the plurality of users to access the file content stored by the file service. The file reference may be shared using an electronic communication, wherein the electronic communication may comprise the file reference. That is, the file content may not be part of the electronic communication, but may instead be accessed by recipients using the file reference.

In some examples, the electronic communication may be processed to identify the file reference within the electronic communication. A file identifier may be generated or retrieved based on the identified file reference, which may be used to determine whether a file node is present in a search data store. In some cases, the search data store may be associated with a productivity application and may be separate and distinct from a file data store associated with a file service (e.g., external file service) storing the file. While the search data store and the file data store may be separate and distinct, the search data store (hereinafter, "data store") may reference (e.g., via one or more file references) files within the file data store. Alternatively, the search data store and the file data store may not be separate and distinct but may be associated with or included within the same data structure (e.g., collectively referred to as a "data store"). For instance, where files are stored by a file service hosted by a productivity service, the same data store may be written-to and read-by the file service and the productivity service. In this case, when a file reference is identified within an electronic communication (e.g., by a message processor), a message node for the electronic communication may be created and associated with the file node associated with the file (e.g., created by the file service) within the data store.

If a file node is not present, a file node associated with the file identifier may be created in the data store, wherein the file node may comprise at least a part of the file content of the referenced file. Unlike the actual file stored by the file service, the file node may act as a lightweight placeholder for the file reference, wherein at least some file content (e.g., keywords, etc.) stored by the file node may be indexed in order to provide search functionality. Additionally, file attributes (e.g., metadata associated with the file, such as author, creation date, last modification date, file name, file size, etc.) may be associated with the file node (e.g., as one or more attribute nodes). A message node including message information associated with the electronic communication (e.g., message content, sender, recipient(s), sent date and time, domain, etc.) may also be created and associated with the file node in the data store. It will be appreciated that while examples described herein may be discussed with respect to a graph database (e.g., nodes and associations), other storage techniques may be used as well, including, but not limited to, a search index or a relational database.

The file node may later be accessed based on the file identifier or as a result of matching file content and/or file attributes (e.g., within the file node) or matching message information (e.g., within a message node associated with the file node) to a search query. Electronic communications relating to the file node may be identified based on identifying message nodes that are associated with the file node in the data store. As a result, a user may access electronic communications relating to a file reference based on the nodes and associations of the data store. Thus, the content of an electronic communication including the file reference may be accessible to the user, even though a search query returning the electronic communication may have matched file content, file attributes, etc., that were not incorporated within the electronic communication itself, but rather were associated with a file reference to a file stored by a file service. Further, the searchable content stored by file nodes of the data store may enable a user to more easily locate files, as compared to merely searching based on a file reference mentioned in an electronic communication.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
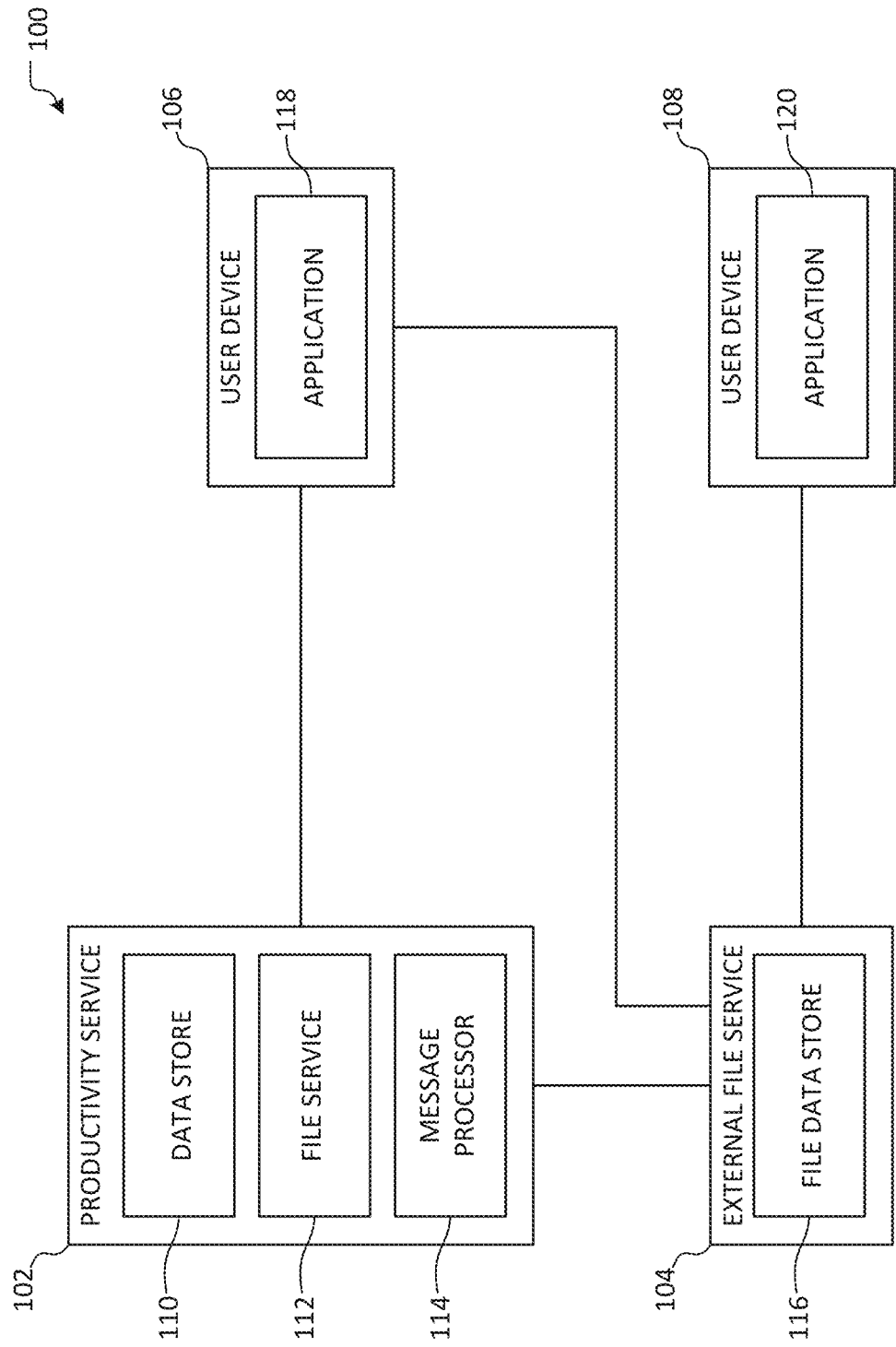
FIG. 1 illustrates an overview of an example system for electronic communication and file reference association.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In an example, a plurality of users may exchange electronic communications via their respective user devices using an electronic communication platform. Example electronic communication platforms include, but are not limited to, an email messaging platform, an instant messaging platform, or a social networking platform. A user may share a file with another user using an electronic communication, wherein the electronic communication may comprise the content of the file, or may comprise a reference to the file. As an example, the reference may be a Uniform Resource Locator (URL), a Uniform Resource Identifier (URI), a hash, or a Globally Unique Identifier (GUID), among other reference types. A recipient of the electronic communication may use the file reference to access the file. However, given that the content of the file may not be incorporated in the electronic communication, it may be difficult to provide certain functionality that may otherwise be possible if the content of the file was part of the electronic communication. Further, user comments relating to the file that were made using the electronic communication platform may not be easily accessible without manually identifying the relevant electronic communications.

Accordingly, the present disclosure provides systems and methods for electronic communication and file reference association. In an example, a file reference of an electronic communication may be stored in a data store. The file reference may be stored as a file node, wherein the file node may comprise the file reference and may be associated with a file identifier. The file identifier may be used to retrieve or access the file node. As compared to performing a search or traversal, accessing a file node using a file identifier (e.g., performing a lookup) may be more performant. In some examples, the file reference may be used to access the file, and at least a part of the content of the file may be stored by the file node. Additionally, file attributes (e.g., author, creation date and time, file size, etc.) associated with the file may be stored in one or more attribute nodes associated with the file node or may be stored within the file node itself. As a result, it may be possible to index or search information stored by the data store, thereby enabling a user to identify files responsive to a query even though the files were communicated using a file reference.

A message node may be generated for an electronic communication. The message node may comprise at least a part of the electronic communication, may comprise a reference to the electronic communication, or an identifier associated with the electronic communication, among other examples. A file node and the message node may be associated (e.g., by an edge or a relationship), such that it may be possible to determine one or more message nodes based on a file node, and vice versa. While examples are discussed herein with respect to associations between file nodes and message nodes in a graph database, it will be appreciated that other data storage techniques may be used.

A file reference may refer to any of a variety of files. In an example, a file may be stored by a file service (e.g., MICROSOFT ONEDRIVE, DROPBOX, AMAZON CLOUD DRIVE, etc.), such that a file reference may comprise a URL or other reference relating to the file stored by the file service. In another example, a file service may be a networked storage device, such that a file reference may comprise a network path of the file on the networked storage device. It will be appreciated that a file may be stored and referenced using any of a variety of other techniques.

As discussed above, a user may share a file using an electronic communication, wherein the electronic communication may comprise a file reference. The file reference may be included as part of the message body of the electronic communication. For example, a URL reference may be included in an email or instant message. In another example, the file reference may be attached to the electronic communication such that it resembles a traditional file. When a user interacts with the attachment, the content of the referenced file may be retrieved or displayed based on the file reference, thereby giving the appearance to the user of a traditional file (e.g., where the content of the file is part of the electronic communication).

In an example, each user may have a data store in which file nodes, attribute nodes, and/or message nodes are stored. The data store may be stored locally on the user's device, may be stored remotely, or a combination thereof. In some examples, each user's data store may be a subpart of the same data store. In some examples, a file node may be created or updated when an electronic communication comprising a file reference is received. For example, a file node in a data store of an electronic communication recipient may be updated to incorporate an association between the file node and a message node for the electronic communication. In other examples, a file node may be created or updated when an electronic communication is transmitted. As an example, a data store of a sender of the electronic communication may be updated to comprise an association between the file node and a message node for the electronic communication. In another example, the sender and recipient may each use the same data store, such that a single message node may be created and associated with the file node for both the sender and the recipient. In such an example, the nodes and/or associations between nodes may be associated with access restrictions or access control information, thereby ensuring that users of the data store may only be able to access file nodes and/or message nodes with which they are associated.

As an example, a first user may communicate a file reference to a second user in a first electronic communication. A file node for the file reference may be created in the data store according to aspects disclosed herein. Similarly, a first message node may be created for the first electronic communication. Both the first user and second user may be able to access the file node and the first message node, given that both users were a sender and a recipient, respectively. In the example in which a single data store is used, a third user may not be able to access the file node and the first message node in the data store, as the third user was not a party to the electronic communication. However, if the first user forwards the first electronic communication to the third user as a second electronic communication, a second message node may be generated in the data store, which may be associated with the file node. The third user may be able to view the file node, as well as the second message node. However, because the second user did not receive the second electronic communication, the second user may not be able to view the second message node. Thus, the first user may be able to view both the first message node and the second node, as well as the file node. By contrast, the second user may only be able to view the first message node and the file node, while the third user may only be able to view the second message node and the file node. Accordingly, access to file nodes, attribute nodes, and/or message nodes within the data store may be conditioned based on a user's participation in an electronic communication, among other factors.

If a file reference has been previously communicated in an electronic communication, a file node associated with the file reference may already exist in a data store. As a result, the data store may be updated to include a newly-generated message node associated with an electronic communication. The message node may then be associated with the pre-existing file node. Thus, a file node may be associated with a plurality of message nodes, thereby enabling electronic communications relating to the file node to be identified and provided to a user.

FIG. 1 illustrates an overview of an example system 100 for electronic communication and file reference association. As illustrated, system 100 is comprised of productivity service 102, external file service 104, user device 106, and user device 108. Productivity service 102 may comprise one or more productivity and/or collaboration tools or applications. As an example, productivity service 102 may be a cloud-based service such as MICROSOFT OFFICE 365, GOOGLE G SUITE, or APPLE ICLOUD, among others.

Productivity service 102 may provide remote file storage via file service 112 and an electronic communication platform via message processor 114. File service 112 and message processor 114 may offer a web-based interface or may be accessed using an application on a user device (e.g., applications 118 and 120 on user devices 106 and 108, respectively), or a combination thereof.

File service 112 and message processor 114 may store information using data store 110. In an example, data store 110 may comprise a graph database, wherein files stored by a user using file service 112 may be stored as file nodes in the graph database of data store 110. In this example, message processor 114 may access file nodes corresponding to file references within data store 110. In this case, messages processed by message processor 114 may be stored as message nodes associated with corresponding file nodes in the graph database of data store 110. According to aspects disclosed herein, an association may be formed between a message node and a file node in data store 110 when a message comprising a file reference to a file of file service 112 is processed by message processor 114. In other examples, a graph database of data store 110 may comprise file nodes and/or message nodes associated with file references and message information, respectively (e.g., generated by message processor 114), while the content of the associated files and/or messages may be stored outside the graph database.

In an example, external file service 104 may provide functionality similar to file service 112 as discussed above. External file service 104 may provide remote file storage and may store files using file data store 116. As an example, external file service 104 may be a cloud-based file service such as DROPBOX or AMAZON CLOUD DRIVE, among others. A user of external file service 104 may share a file stored by external file service 104 using a file reference, such as a URL or a URI, among others.

User devices 106 and 108 comprise applications 118 and 120, respectively. In an example, user devices 106 and 108 may each be a computing device, including, but not limited to, a mobile computing device, a tablet computing device, a desktop computing device, or a laptop computing device. Applications 118 and 120 may each be any of a variety of applications, including, but not limited to, a web browser executing a website or web-based application, a native client application, or an email or instant messaging application.

As illustrated, user device 108 may communicate with external file service 104. A user of user device 108 may use application 120 to access files stored by external file service 104. For example, the user may generate a share URL for a file in order to share the file with a user of user device 106. As a result, external file service 104 may communicate the URL (e.g., a file reference) in an electronic communication to productivity service 102. In an example, the electronic communication may be an email message, wherein the recipient of the email message is indicated to be the user of user device 106. Message processor 114 may deliver the message to the mailbox of the recipient user. In other examples, the electronic communication may be generated and transmitted by user device 108, or a mail server (not pictured) communicating with an application of user device 108.

As discussed above, message processor 114 may identify the file reference in the electronic communication, and may generate or identify a corresponding file node in data store 110. The file node may comprise the file reference, and may be associated with a file identifier. The file identifier may be generated based on the file reference, based on information received from or requested from external file service 104, or generated based on the electronic communication, among other examples. In some examples, message processor 112 may request file information (e.g., at least a portion of the file content, file attributes, etc.) from external file service 104, which may be stored as part of the file node. Message processor 114 may generate a message node associated with the electronic communication, and may store the message node in data store 110. The message node and the file node may be associated (e.g., via an edge or relationship), such that the message node may be determined based on the file node or the file identifier, or the file node may be determined based on the message node.

The recipient user may receive or access the electronic communication (e.g., using application 118) and may access the file using the file reference in the electronic communication. As a result of the association generated by message processor 114, the recipient user may be able to identify electronic communications associated with the file reference. Further, in an example where message processor 114 stored at least a portion of the file content in data store 110, the content may be searchable, thereby enabling the file and associated electronic communications to be easily identified by the recipient user.

In another example, user device 106 may be the sender of an electronic communication, wherein the electronic communication may comprise a file reference. Similar to the example discussed above, the file reference may be identified (e.g., by message processor 114), and a file node associated with the file reference may be stored in data store 110. The electronic communication may be used to create a message node, which may be associated with the file node. Thus, it will be appreciated that aspects disclosed herein may be applied to electronic communications of file references, regardless of whether the electronic communication is sent, received, or accessed, among others.

Figure 2:
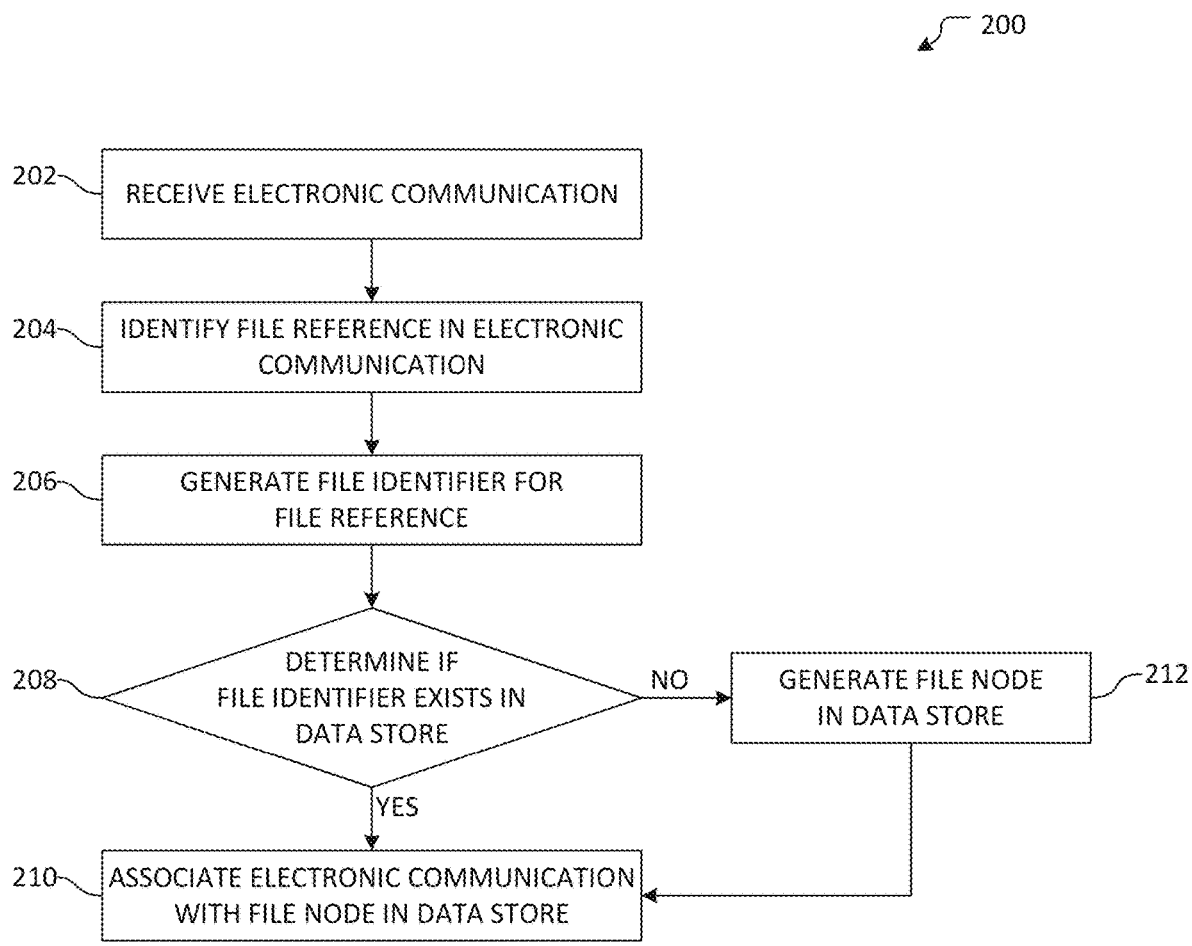
FIG. 2 illustrates an overview of an example method for generating an association between an electronic communication and a file reference.

FIG. 2 illustrates an overview of an example method 200 for generating an association between an electronic communication and a file reference. In an example, method 200 may be performed by one or more computing devices. In some examples, method 200 may be performed by message processor 114 in FIG. 1. Method 200 begins at operation 202, where an electronic communication may be received. In an example, the electronic communication may be received from a user device, from a mail server, or from a cloud-based service, among other sources. The electronic communication may be a sent or received email message, instant message, or social network message, among others.

Moving to operation 204, a file reference may be identified in the electronic communication. Identifying the file reference may comprise evaluating at least a part of the electronic communication using pattern matching techniques. In an example, fuzzy or inexact matching may be used, as a file reference may vary depending on one or more factors, including, but not limited to, a version number of the document and/or a last-modified time. In some examples, the electronic communication may comprise headers, fields, or metadata indicating or comprising a file reference. In other examples, user input may be received, wherein the user input may comprise an indication of a file reference within the electronic communication.

Flow progresses to operation 206, where a file identifier may be generated for the identified file reference. In an example where the file reference refers to a file stored by an external file service (e.g., external file service 104 in FIG. 1), the file identifier may be generated based on the file reference, based on information received from or requested from the file service storing the referenced file, or generated based on the electronic communication, among other examples. In an example where the file reference refers to a file stored by an internal file service (e.g., a file stored by file service 112 in relation to message processor 114 in FIG. 1), generating the file identifier may comprise using at least a part of the file reference or retrieving a file identifier associated with a file node corresponding to the file reference (e.g., within data store 110). While example techniques are discussed herein, it will be appreciated that other techniques may be used to generate or retrieve the file identifier.

Moving to determination 208, it may be determined whether the generated file identifier exists in a data store. As discussed above, the data store may comprise a graph comprising one or more file nodes associated with file identifiers. The data store may be a user-specific data store or a centralized data store, among other data stores. Determining whether the generated file identifier exists may comprise searching or traversing the data store, or performing a lookup based on the generated file identifier. In some examples, inexact matching may be used, as the generated file identifier may vary depending on file versioning or a last-modified date, among other factors.

If, at determination 208, it is determined that the identifier exists in the data store, flow branches "YES" to operation 210, where the electronic communication may be associated with a file node in the data store. In an example, associating the electronic communication may comprise generating a message node associated with the electronic communication and storing the message node in the data store as an edge or relationship to the file node. In another example, a message identifier associated with the electronic communication and/or at least a part of the electronic communication may be stored in the data store and associated with the file node. In some examples, information relating to the referenced file that may be stored by the file node (e.g., at least a part of the file contents, a last-modified time, etc.) may be updated based on the current state of the file (e.g., at the time the electronic communication was sent or received). Flow terminates at operation 210.

If, however, it is determined at determination 208 that the identifier does not exist in the data store, flow branches "NO" to operation 212 where a new file node may be generated in the data store. In an example, generating the new file node may comprise accessing the file associated with the file reference and storing at least a part of the content in the file node. In some examples, other file information such as file metadata (e.g., file attributes) may be stored as part of the file node, including, but not limited to, a last-modified time, an author, or a list of editors. Flow then progresses to operation 210, which was discussed above. After operation 210, flow terminates.

Figure 3:
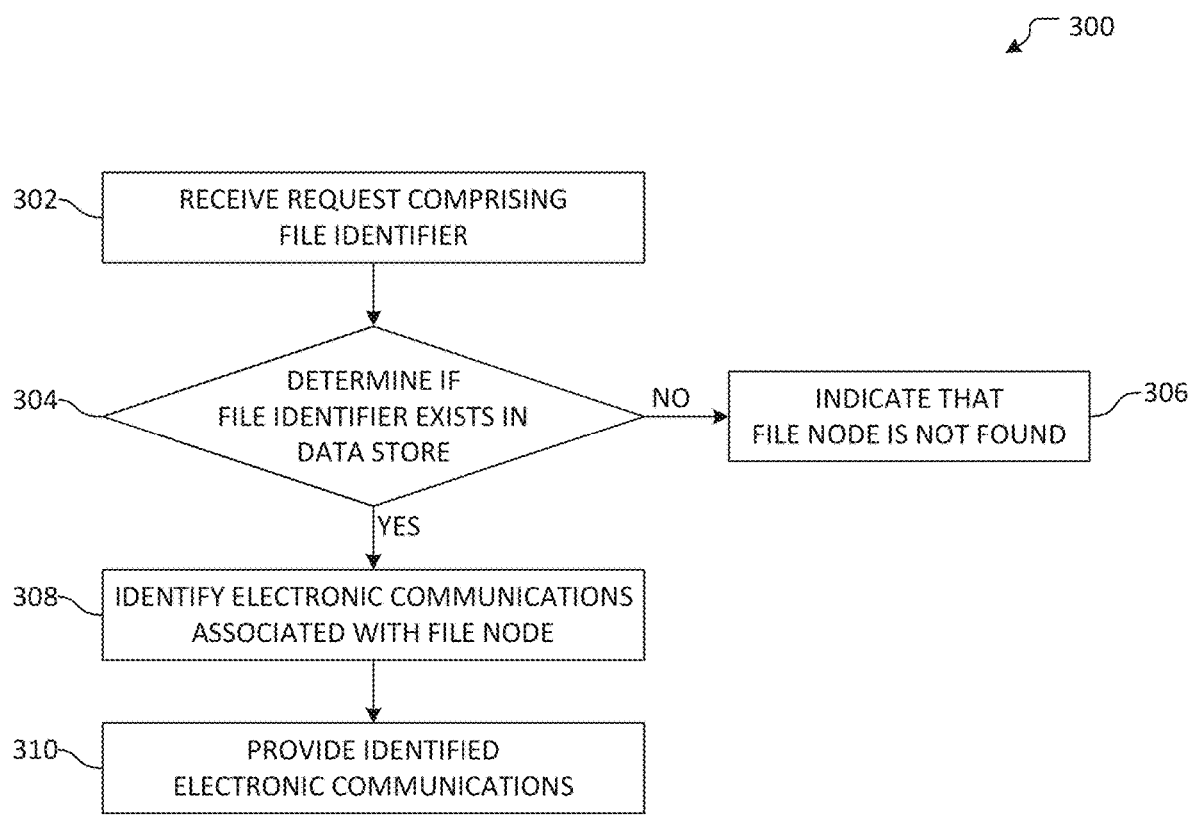
FIG. 3 illustrates an overview of an example method for retrieving electronic communications based on a file reference.

FIG. 3 illustrates an overview of an example method 300 for retrieving electronic communications based on a file reference. In an example, method 300 may be performed by one or more computing devices. In some examples, method 300 may be performed by productivity service 102 in FIG. 1. Method 300 begins at operation 302, where a request comprising a file identifier may be received. In an example, the file identifier may have been generated from a file reference according to aspects disclosed herein. The request may be received from a client application (e.g., client application 118 or 120 in FIG. 1), which may display file content associated with the file reference or display an electronic communication comprising the file reference, among other client applications. In an example, a user indication may be received by the client application, wherein the user may indicate that electronic communications relating to the file reference should be identified, thereby causing the received request to be transmitted.

In another example, the file identifier may have been determined from a file node in a data store. A client application may display a list of files associated with file nodes (as will be discussed in greater detail below with respect to FIG. 4C), wherein a user may indicate that electronic communications associated with a listed file should be identified, thereby causing the received request comprising the file identifier to be transmitted. It will be appreciated that, in other examples, the received request may comprise the file reference or one or more keywords, among other identifying information.

Moving to determination 304, it may be determined whether the received file identifier exists in a data store. As discussed above, the data store may comprise a graph comprising one or more file nodes associated with file identifiers. The data store may be a user-specific data store or a centralized data store, among other data stores. Determining whether the file identifier exists may comprise searching or traversing the data store, or performing a lookup based on the file identifier. In some examples, inexact matching may be used, as the file identifier may vary depending on file versioning or a last-modified date, among other factors.

If, at determination 304, it is determined that the file identifier does not exist in the data store, flow branches "NO" to operation 306, where an indication may be provided in response to the request that a file node associated with the file identifier was not found. Flow terminates at operation 306. If, however, it is determined at determination 304 that a file node associated with the received file identifier exists in the data store, flow branches "YES" to operation 308, where electronic communications associated with the file node may be identified. In an example, identifying associated electronic communications may comprise evaluating associations (e.g., relationships or edges, etc.) of the file node to determine whether any of the related nodes are message nodes. In some examples, a message node may comprise a reference to an electronic communication associated with the file node, or may comprise at least a part of the electronic communication.

At operation 310, the identified electronic communications may be provided in response to the received request. In an example, providing the electronic communications may comprise providing references associated with one or more of the identified message nodes. In another example, at least a part of the content of the one or more identified message nodes may be provided in the response. Flow terminates at operation 310.

Figure 4A:
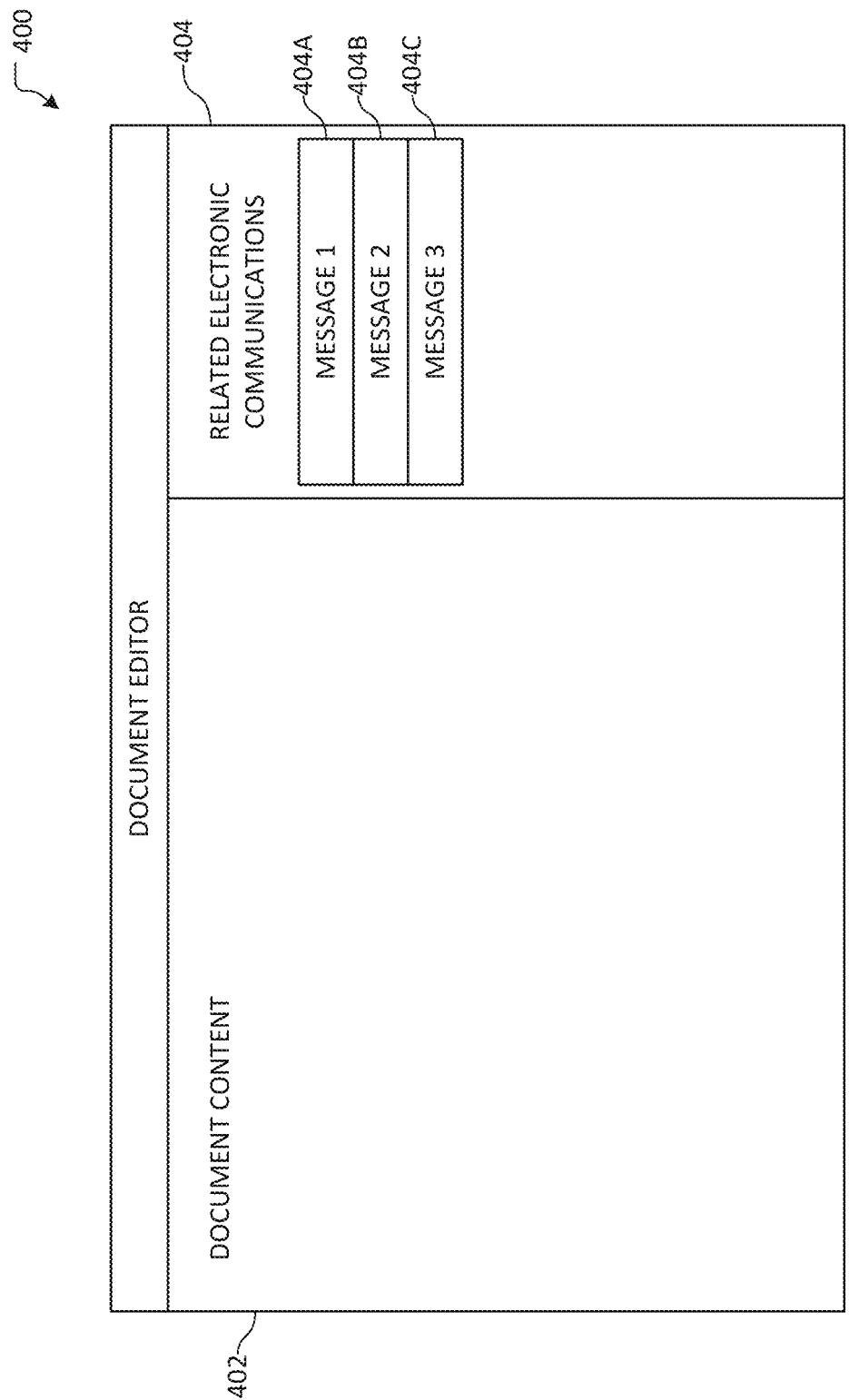
FIGS. 4A-4C illustrate overviews of example user interfaces relating to aspects of electronic communication and file reference association.
Figure 4B:
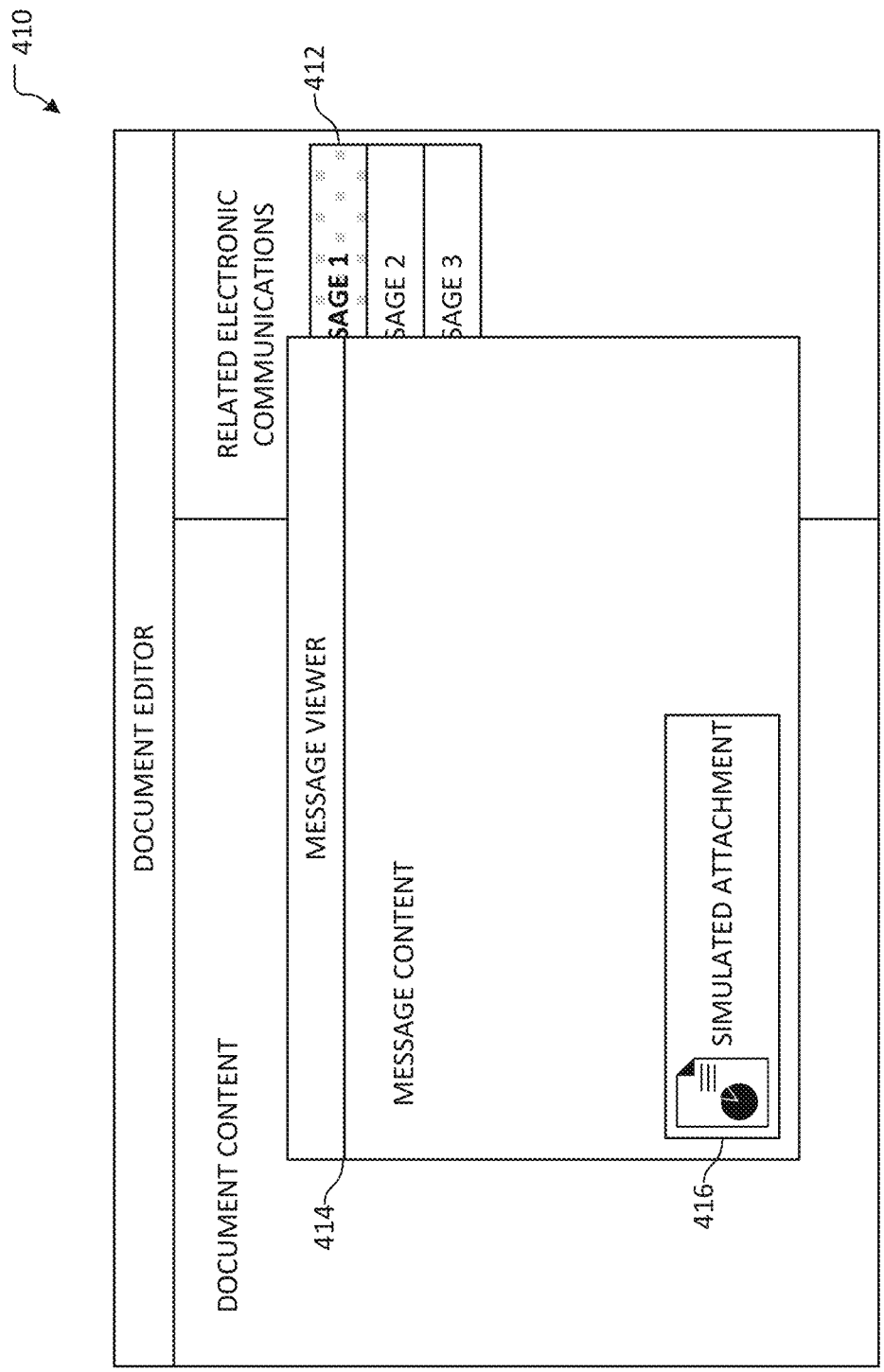
Figure 4C:
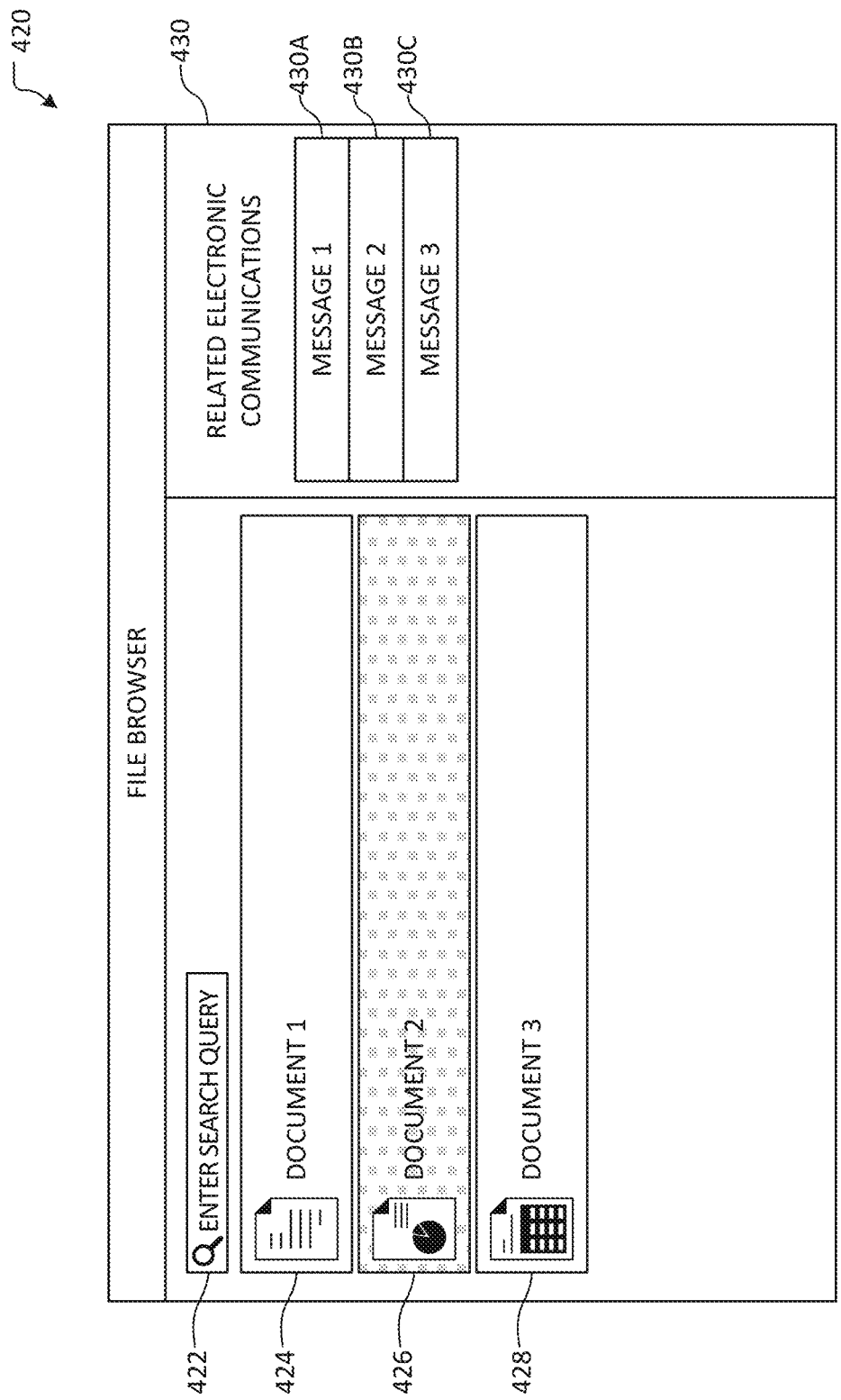

FIGS. 4A-4C illustrate overviews of example user interfaces relating to aspects of electronic communication and file reference association. The example user interfaces may be displayed by a user device (e.g., user devices 104 or 106 in FIG. 1) when accessing a file, a file service, or an electronic communication platform according to aspects disclosed herein.

With reference to FIG. 4A, user interface 400 is depicted as a document editor. In an example, user interface 400 may be provided by a file service, such as file service 112 or external file service 104 in FIG. 1. A user may access user interface 400 using an application (e.g., applications 118 or 120 in FIG. 1), such as a web application or a client application, among others. As illustrated, user interface 400 comprises document content pane 402 and related electronic communications pane 404. Document content pane 402 may comprise content of a file stored by the file service. In some examples, the file may be accessed from the file service using a file reference.

User interface 400 also comprises related electronic communications pane 404, which may comprise electronic communications that have included or mentioned the file reference. Messages 404A-404C may have been identified as related electronic communications based on the file reference. As discussed above with respect to method 300 in FIG. 3, a file identifier may be generated based on the file reference of the document displayed by document content pane 402. The file identifier may be used to identify a file node in a data store, such that message nodes that are related to the file node may be determined. The related message nodes may be displayed by user interface 400, thereby enabling a user to access electronic communications that relate to the file. As a result of the association between the file node and related message nodes, a user may be able to retrieve conversations, comments, revisions, and other information from electronic communications about the file, even though the information may not have been incorporated within the file itself. Thus, the user may be able to easily gather information about a file that would otherwise have been difficult or impossible to obtain.

Turning now to FIG. 4B, user interface 410 illustrates an example user interface wherein message 1 412 has been selected. As illustrated, message 1 412 may be shaded to indicate that it has been selected. As a result of selecting message 1 412, message viewer 414 may be displayed, thereby presenting at least a part of the message content to the user. As illustrated, message 1 412 also comprises simulated attachment 416. Simulated attachment 416 may appear to be a traditional file attachment. However, rather than containing file content (as may ordinarily be the case for a traditional file attachment), simulated attachment 416 may instead comprise a file reference, wherein the content of simulated attachment 416 may be stored elsewhere. The file reference may be used to access the content of simulated attachment 416 from a file service or a networked data store, among other data stores. In some examples, simulated attachment 416 may comprise additional information, including, but not limited to, metadata or at least a part of the file content of simulated attachment 416.

In other examples, a message or electronic communication may include a file reference as part of the message content (e.g., in an email message body, as an instant message, etc.). In such an example, the file reference may be a URL or a file path, among other reference types, which, when selected by a user, may open the referenced file for display to the user. It will be appreciated that while example file reference techniques are described herein, other techniques may be used.

With reference to FIG. 4C, user interface 420 illustrates an example file browser. In an example, user interface 420 may be provided by a file service, such as file service 112 or external file service 104 in FIG. 1. In another example, user interface 420 may be provided by an electronic communication platform, thereby enabling a user to search for or browse through files that have been discussed in electronic communications. A user may access user interface 420 using an application (e.g., applications 118 or 120 in FIG. 1), such as a web application or a client application, among others. As illustrated, user interface 420 comprises search box 422, documents 424-426, related electronic communications pane 430, and messages 430A-430C.

Search box 422 may be used to search for files and, by extension, related electronic communications, based on content, rather merely identifying files based on a file reference or file identifier. As discussed above, when an electronic communication is received comprising a file reference, a file node may be generated, wherein the file node may comprise at least a part of the content of the referenced file. The file content of one or more file nodes may be indexed, such that file nodes may later be searched to identify files based on content matching rather than browsing through the files or accessing a file by providing a specific file reference or file identifier. It will be appreciated that other search techniques or criteria may be used to search for files, including, but not limited to, file authorship, last-modified date, based on sender and/or recipients, or which file service is storing the file contents.

As illustrated, document 2 426 is shaded, thereby indicating that document 2 426 has been selected. As a result, related electronic communications pane 430 may be updated to contain electronic communications in which a file reference associated with document 2 426 was communicated. In an example, updating related electronic communications pane 430 may comprise using a file reference of document 426 to generate a file identifier. The file identifier may then be used to identify a file node in a data store, such that message nodes that are related to the file node may be determined. In another example, a file node associated with document 2 426 may have been identified as a result of searching for file nodes matching a specified search criteria (e.g., using search box 422), such that message nodes related to the identified file node may be determined. The related message nodes may then be displayed by related electronic communications pane 430, thereby enabling a user to access electronic communications that relate to the file. As a result, a user may be able to retrieve conversations, comments, and revisions that were communicated about the file, but were communicated as electronic communications about the file rather than within the file itself. Similar to FIG. 4B, a user may interact with messages 430A-430C in order to access the content of the related electronic communications.

While example user interfaces are discussed herein with respect to FIGS. 4A-4C, it will be appreciated that aspects of the disclosed techniques may be integrated into any of a variety of applications and usage scenarios.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
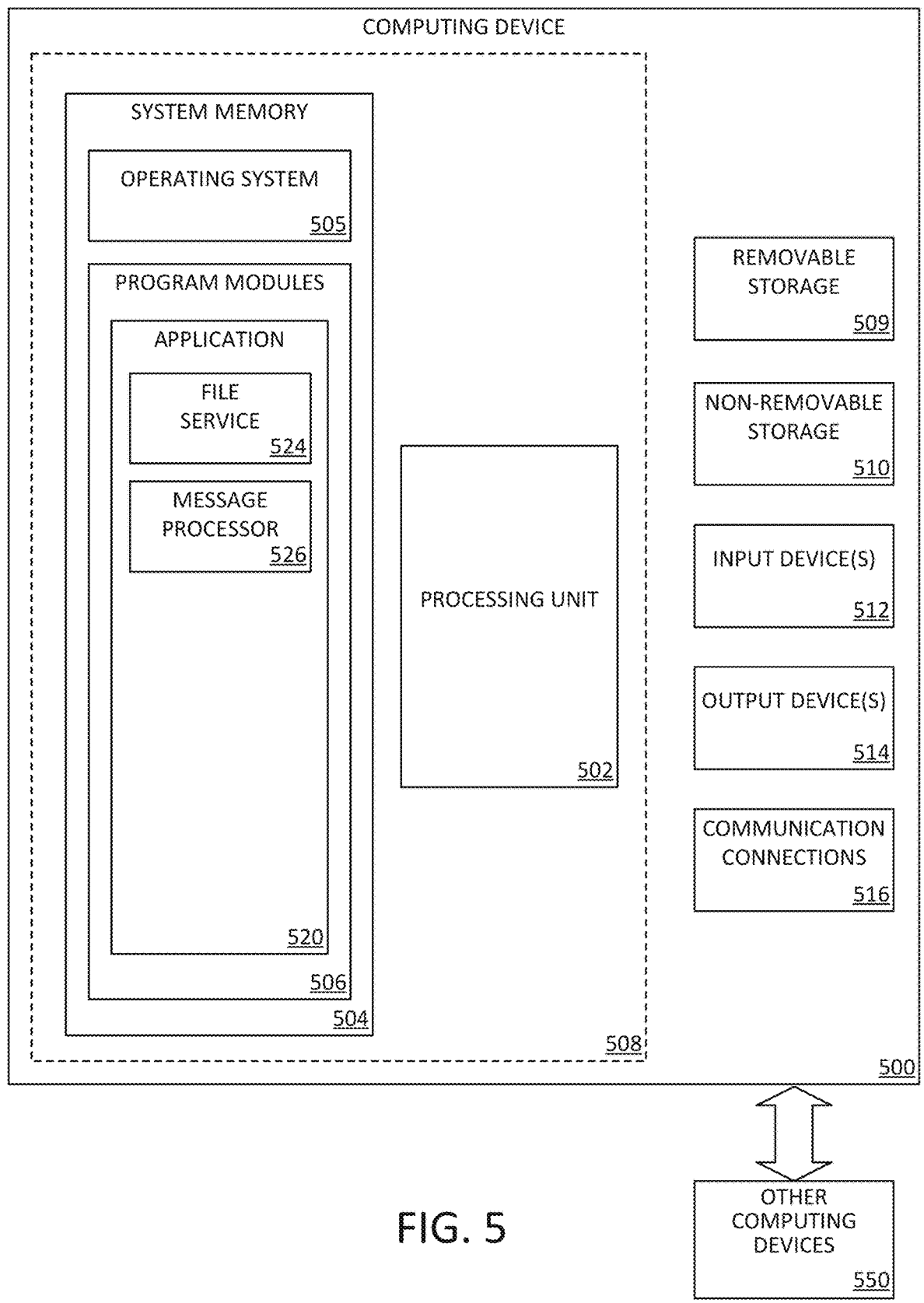
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for performing the various aspects disclosed herein such as file service 524 and message processor 526. The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
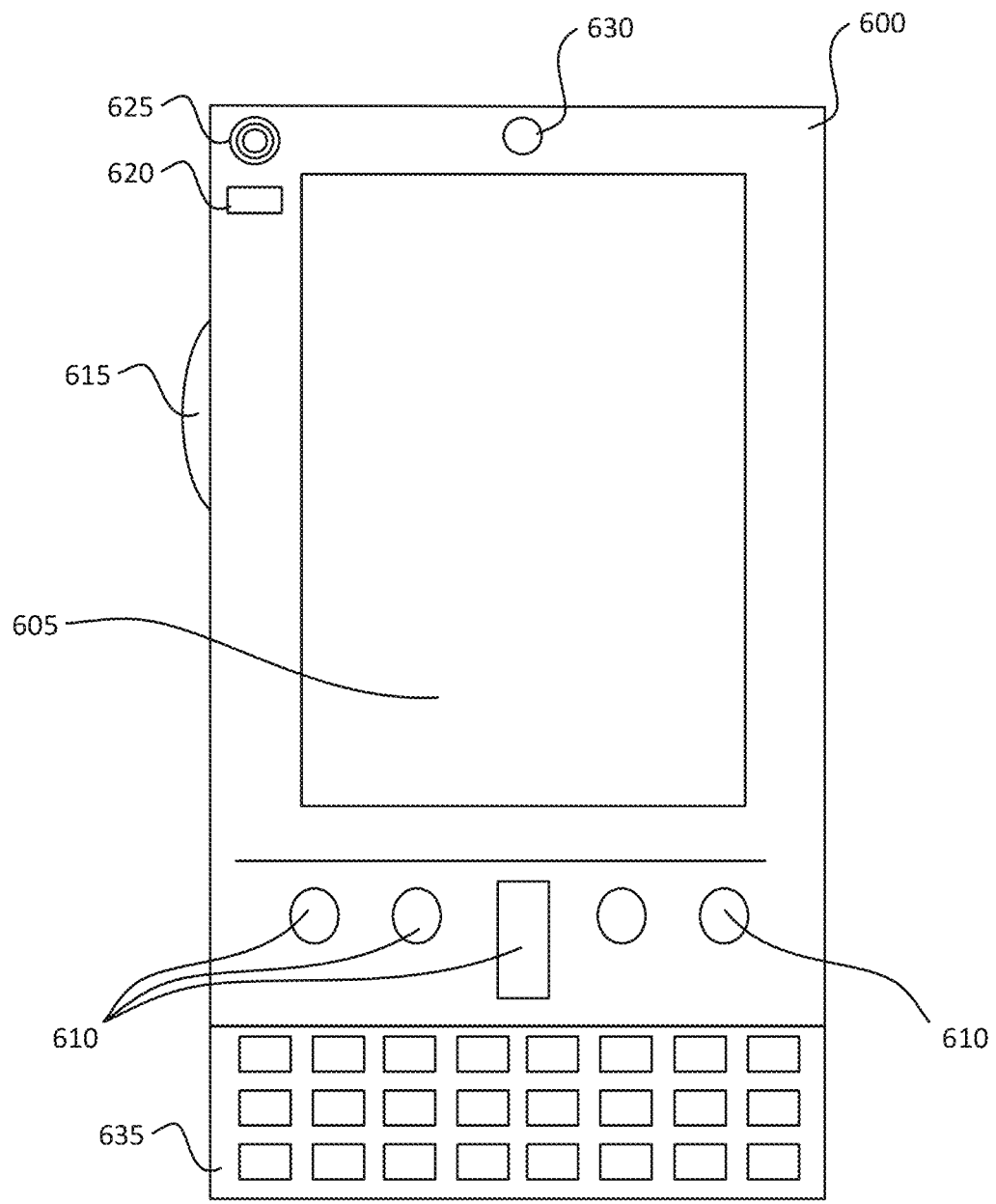
FIGS. 6A and 6B are simplified block diagrams of a mobile computing device with which aspects of the present disclosure may be practiced.
Figure 6B:
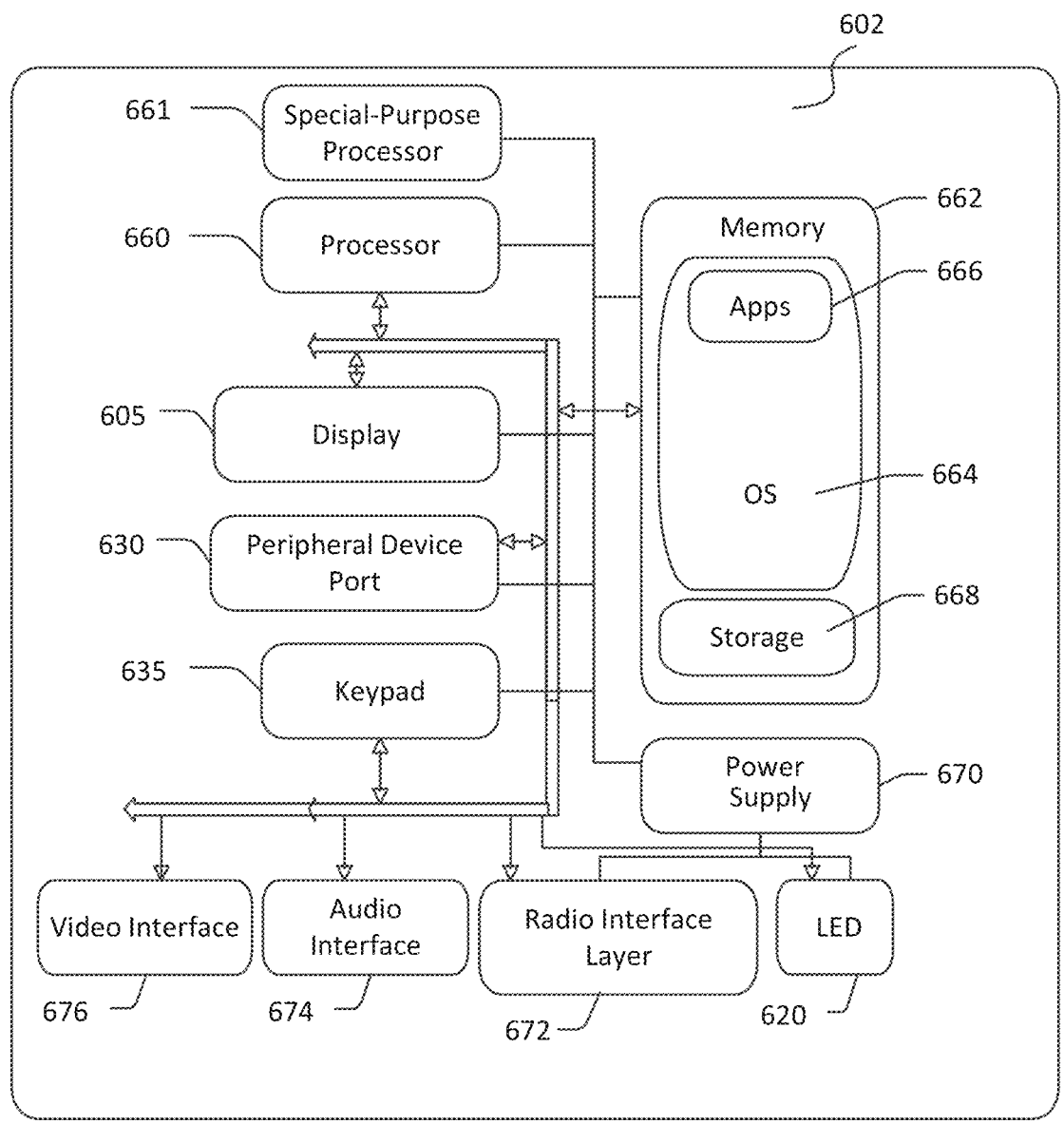

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
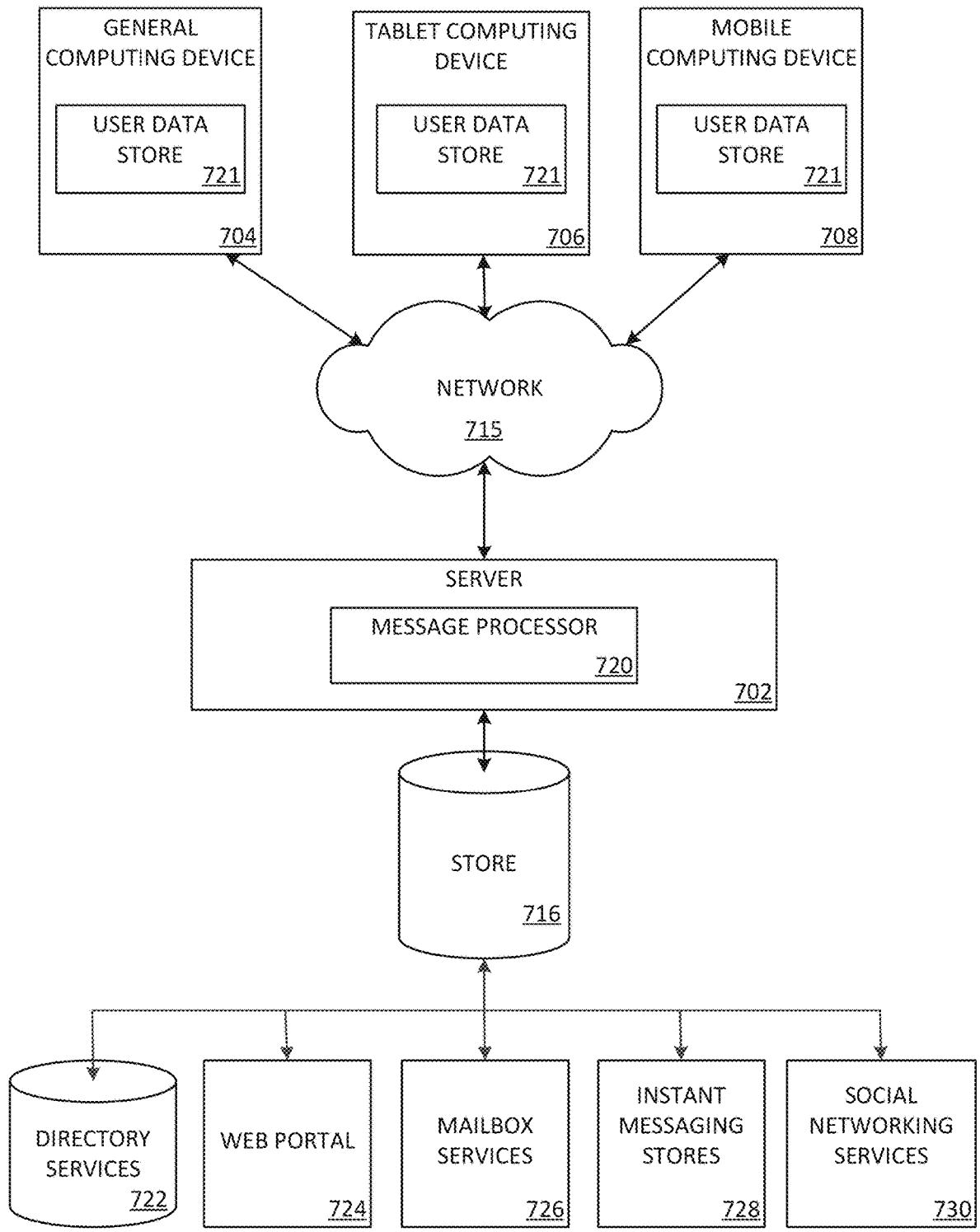
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730. User data store 721 may store file nodes and/or message nodes locally, and/or message processor 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
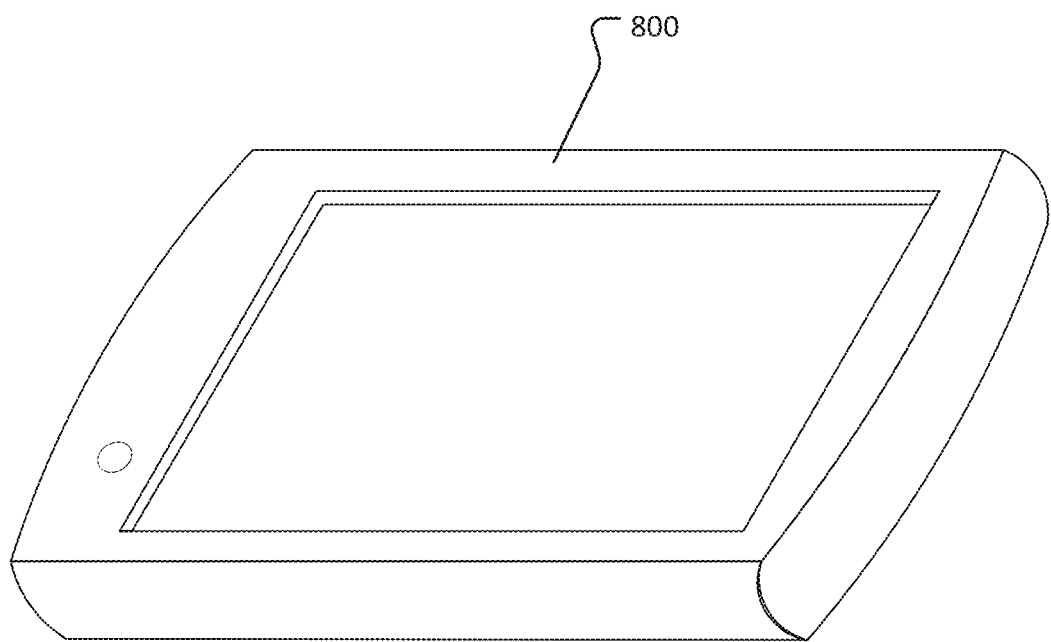
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving, at a computing device, an electronic communication, wherein the electronic communication comprises a file reference associated with a file stored by a file service; determining whether a file node associated with the file is stored in a data store; when it is determined that a file node is not stored in the data store, generating a file node in the data store; generating a message node for the electronic communication; and storing the message node in the data store, wherein the message node is associated with the file node. In an example, generating the file node comprises: accessing the file service to retrieve file information for a file associated with the file reference; and storing the file information in the file node. In another example, generating the message node comprises generating a message node comprising at least one of: a message identifier associated with the electronic communication; and at least a portion of content of the electronic communication. In a further example, the file reference is a simulated attachment of the electronic communication. In yet another example, the file information comprises at least one of: at least a portion of content of the file; a last-modified time of the file; and an author of the file. In a further still example, the file reference is identified in the electronic communication using pattern matching. In another example, determining whether a file node associated with the file is stored in a data store comprises: generating a file identifier for the file reference; and determining whether a file node associated with the generated file identifier is stored in the data store.

In another aspect, the technology relates to a method for identifying an electronic communication associated with a file. The method comprises: receiving, at a computing device, a request comprising file information associated with the file; determining whether a file node associated with the file information is stored in a data store; when it is determined that a file node associated with the file information is stored in the data store, determining one or more message nodes associated with the file node in the data store, wherein each of the one or more message nodes is associated with an electronic communication comprising a file reference to the file; and providing at least one of the one or more message nodes to the computing device in response to the request. In an example, providing at least one of the one or more message nodes comprises providing message information associated with the one or more message nodes. In another example, determining one or more message nodes associated with the file node comprises evaluating access control information of associations between the file node and the one or more message nodes. In a further example, the file information comprises at least one of: a key word; a file attribute; and a file reference. In yet another example, determining whether a file node associated with the file information is stored in a data store comprises performing a lookup based on a file identifier, wherein the file identifier is generated based on the file reference. In a further still example, generating the file identifier based on the file reference comprises: receiving information from a file service storing a file associated with the file reference; and generating the file identifier based on the received information.

In a further aspect, the technology relates to a method for electronic communication and file reference association. The method comprises: receiving, at a computing device, an electronic communication, wherein the electronic communication comprises a file reference associated with a file stored by a file service; determining whether a file node associated with the file is stored in a data store; when it is determined that a file node is not stored in the data store, generating a file node in the data store; generating a message node for the electronic communication; and storing the message node in the data store, wherein the message node is associated with the file node. In an example, generating the file node comprises: accessing the file service to retrieve file information for a file associated with the file reference; and storing the file information in the file node. In another example, generating the message node comprises generating a message node comprising at least one of: a message identifier associated with the electronic communication; and at least a portion of content of the electronic communication. In a further example, the file reference is a simulated attachment of the electronic communication. In yet another example, the file information comprises at least one of: at least a portion of content of the file; a last-modified time of the file; and an author of the file. In a further still example, the file reference is identified in the electronic communication using pattern matching. In another example, determining whether a file node associated with the file is stored in a data store comprises: generating a file identifier for the file reference; and determining whether a file node associated with the generated file identifier is stored in the data store.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
    at least one processor; and
    a memory storing instructions that, when executed by the at least one processor, perform operations, comprising:
        receiving, at a computing device, an electronic communication, wherein the electronic communication comprises a simulated attachment that is a file reference to a file stored by a file service; and
        in response to receiving the electronic communication:
            determining whether a file node associated with the file is stored in a data store, wherein the data store is a graph database;
            based on determining that the file node is not stored in the data store, generating a file node in the data store for the file stored by the file service, wherein generating the file node comprises:
                accessing content of the file stored by the file service; and
                storing the content in the file node;
            generating a message node for the electronic communication;
            storing the message node in the data store; and
            associating the message node with the file node.

2. The system of claim 1, wherein generating the message node comprises generating a message node comprising at least one of:
    a message identifier associated with the electronic communication; and
    at least a portion of content of the electronic communication.

3. The system of claim 1, wherein the content of the file comprises at least one of:
    a last-modified time of the file; and
    an author of the file.

4. The system of claim 1, wherein the file reference is identified in the electronic communication using pattern matching.

5. The system of claim 1, wherein determining whether a file node associated with the file is stored in a data store comprises:
    generating a file identifier for the file reference; and
    determining whether a file node associated with the generated file identifier is stored in the data store.

6. The system of claim 1, wherein the operations further comprises:
    receiving a second electronic communication, wherein the second electronic communication comprises another file reference to the file stored by the file service;
    generating a second message node for the second electronic communication; and
    associating the second message node with the file node in the data store.

7. A method for identifying an electronic communication associated with a file, comprising:
    receiving, at a computing device, a request comprising file information associated with the file;
    determining whether a file node associated with the file information is stored in a data store, wherein the data store is a graph database;
    based on determining that a file node associated with the file information is stored in the data store, identifying a plurality of message nodes associated with the file node in the data store, wherein at least one message node of the plurality of message nodes was created in response to a receipt of an electronic communication comprising a file reference to the file; and
    providing at least one message node of the plurality of message nodes to the computing device in response to the request.

8. The method of claim 7, wherein providing the at least one message node comprises providing message information associated with the at least one message node.

9. The method of claim 7, wherein determining the plurality of message nodes associated with the file node comprises evaluating access control information of at least one association between the file node and a message node of the plurality of message nodes.

10. The method of claim 7, wherein the file information comprises at least one of:
    a key word;
    a file attribute; and
    a file reference.

11. The method of claim 7, wherein determining whether a file node associated with the file information is stored in a data store comprises performing a lookup based on a file identifier, wherein the file identifier is generated based on the file reference.

12. The method of claim 11, wherein generating the file identifier based on the file reference comprises:
    receiving information from a file service storing a file associated with the file reference; and
    generating the file identifier based on the received information.

13. A method for electronic communication and file reference association, comprising:
    receiving, at a computing device, an electronic communication, wherein the electronic communication comprises a simulated attachment that is a file reference associated with a file stored by a file service;

determining whether a file node associated with the file is stored in a data store, wherein the data store is a graph database;

based on determining that the file node is not stored in the data store, generating a file node in the data store for the file stored by the file service, wherein generating the file node comprises:

accessing content of the file stored by the file service; and storing the content in the file node;

in response to receiving the electronic communication:

generating a message node for the electronic communication; and storing the message node in the data store, wherein the message node is associated with the file node.

14. The method of claim 13, wherein generating the message node comprises generating a message node comprising at least one of:

a message identifier associated with the electronic communication; and at least a portion of content of the electronic communication.

15. The system of claim 13, wherein the content of the file comprises at least one of:

a last-modified time of the file; and an author of the file.

16. The method of claim 13, wherein the file reference is identified in the electronic communication using pattern matching.

17. The method of claim 13, wherein determining whether a file node associated with the file is stored in a data store comprises:

generating a file identifier for the file reference; and determining whether a file node associated with the generated file identifier is stored in the data store.

18. The method of claim 13, further comprising:

receiving a second electronic communication, wherein the second electronic communication comprises another file reference to the file stored by the file service;

generating a second message node for the second electronic communication; and associating the second message node with the file node in the data store.

* * * * *